United States Patent [19]
Garcia

[11] Patent Number: 5,241,616
[45] Date of Patent: Aug. 31, 1993

[54] OPTICAL PATTERN RECOGNITION SYSTEM UTILIZING RESONATOR ARRAY

[75] Inventor: Joseph P. Garcia, Silver Spring, Md.

[73] Assignee: The United States of America as represented by the Secretary of the Navy, Washington, D.C.

[21] Appl. No.: 937,098

[22] Filed: Aug. 31, 1992

[51] Int. Cl.[5] .......................... G02B 6/06; G06K 9/34; H01S 3/30; H01S 3/08

[52] U.S. Cl. ...................................... 385/126; 385/15; 385/27; 385/42; 385/116; 385/122; 382/10; 382/65; 372/6; 372/21; 372/92; 372/97; 359/27; 359/34; 359/341; 359/346

[58] Field of Search .................. 385/15, 24, 27, 28, 385/29, 30, 42, 115, 116, 120, 123, 126, 127, 122, 147; 382/10, 41, 56, 65, 69; 372/6, 18, 19, 21, 92, 96, 97, 98, 94; 359/27, 15, 34, 346, 341

[56] References Cited

U.S. PATENT DOCUMENTS

| | | | |
|---|---|---|---|
| 3,292,103 | 12/1966 | Soules et al. | 372/6 |
| 3,576,502 | 4/1971 | Johnston, Jr. et al. | 372/92 X |
| 3,838,903 | 10/1974 | Leith et al. | 359/565 X |
| 4,317,610 | 3/1982 | Breglia et al. | 359/24 X |
| 4,576,434 | 3/1986 | Huignard et al. | 359/34 X |
| 4,674,824 | 6/1987 | Goodman et al. | 359/559 X |
| 4,682,335 | 7/1987 | Hughes | 372/92 X |
| 4,849,986 | 7/1989 | Boerner et al. | 372/97 |
| 4,869,579 | 9/1989 | Fischer et al. | 372/21 X |
| 5,004,342 | 4/1991 | Bernard et al. | 372/94 X |
| 5,008,887 | 4/1991 | Kafka et al. | 372/6 |
| 5,050,173 | 9/1991 | Hughes | 372/6 |
| 5,050,183 | 9/1991 | Duling, III | 372/94 |
| 5,067,792 | 11/1991 | Lloyd | 359/34 X |
| 5,121,400 | 6/1992 | Verdiell et al. | 372/97 X |
| 5,181,210 | 1/1993 | Chung et al. | 372/6 |
| 5,184,232 | 2/1993 | Burney | 359/34 X |
| 5,195,149 | 3/1993 | Pfeiffer et al. | 372/6 X |

Primary Examiner—Brian Healy
Attorney, Agent, or Firm—John D. Lewis; Jacob Shuster

[57] ABSTRACT

Separate features of a composite image in a field of view illuminated by a laser beam are respectively monitored by low level optical cavity resonators of an array from which optical data outputs are distributed to high level resonators for optical data correlation. Adjacent low level resonators of the array are coupled by controllers for modal interaction modified by feedback to the controllers from the high level resonators through optical signal transforming means for signal correction purposes in pattern recognition of the composite image.

25 Claims, 12 Drawing Sheets

OPTICAL PATTERN RECOGNITION SYSTEM UTILIZING RESONATOR ARRAY

BACKGROUND OF THE INVENTION

This invention relates generally to a data processing system involving adaptive logic and more particularly to a pattern recognition system through which optical image data is processed.

The use of lasers, optical fibers and other optical elements such as lenses, lenslet arrays, holograms and optical transforms for image sensing, coding and data processing purposes is generally well known. Systems utilizing such optical elements have been developed for pattern recognition purposes as disclosed for example in U.S. Pat. Nos. 3,838,903, 4,317,610 and 4,674,824 to Leith et al., Breglia et al. and Goodman et al., respectively.

The use of an optical fiber type of cavity resonator is also known in the art as disclosed for example in U.S. Pat. Nos. 3,576,502, 5,004,342, 5,008,887 and 5,050,183 to Johnston, Jr., Bernard et al., Kofka et al. and Duling-.III. According to the Johnson Jr. patent, bistable states of the cavity resonator having mode competitive gain, are defined by transverse mode switching in response to an injected low level input. Laser light conducting fiber ring types of cavity resonators are disclosed in the other aforementioned cavity resonator patents. According to the Duling III patent, the optical ring fibers are doped and provided with a coupling to an optical pump while the Kafka et al. patent discloses a doped fiber ring coupled to a source of laser light through a dichroic mirror.

It is an important object of the present invention to provide a system which may be implemented by prior art use of the aforementioned optical elements including optical cavity resonators, to perform image pattern recognition functions in a more reliable and noise-free manner.

SUMMARY OF THE INVENTION

In accordance with the present invention, an array of nonlinear optical resonator devices is used for pattern recognition based on each resonator device of the array supporting a family of oscillation modes for light energy circulated therethrough. In each resonator device a dynamical process occurs among resonant modes in response to an input wherein a competitive gain process having one dominating mode suppresses the oscillation of other modes because of non-linear modal coupling. An input directed to a particular resonator device is a feature component of a complete pattern encoded with coherent light. The feature components located at various positions in an image field are made to uniquely correspond to resonator mode of collocated resonators by optical transforms. The resonator mode of a given resonator is mapped back to its corresponding feature through an inverse transform so that a given resonator will return a pattern corresponding to the most intense input image component or feature of a composite image located within a field of view of a resonator device. According to one embodiment the composite image is a line drawing in which line segments located within the field of view of given the resonator device constitute the features. Various orientations of the line segments are uniquely mapped to corresponding resonator modes.

Pursuant to the present invention, various resonator devices of the foregoing type cooperate in an array to achieve pattern recognition by interplay between local and global information. Such interplay action is brought about with hierarchal and lateral interaction between resonator devices. For example, an array of resonators at a low input level have their outputs fed to higher level hierarchal resonators through an optical signal transforming array. The high level resonators are similar to the the low level resonators except that the modes corresponding to the differences in state of the low level resonators. The feedback signal output of the high level resonators are fed by the signal transforming array into coupling controllers associated with the array of low level resonators which thereby bias a given low level resonator toward a particular mode as a function of the state of the high level resonators and adjacent low level resonators. Image pattern recognition is thereby achieved in a noise-free manner by associative recall. The signal transforming array, according to one embodiment, includes a plurality of spatial light valves unique to each transform of the array having their optical transmissivity varied according to the intensity of associated modes of a high level resonator. Tag signals are applied to the transformed signals at the transform to distinguish between the various transforms.

According to certain embodiments of the invention, each of the optical resonators is formed from a multimode polarization preserving optical fiber that has a core composed of a photorefractive material. A stimulated emission gain mechanism is provided to permit laser amplification of light in the core. The foregoing fiber establishes a resonant cavity for its resonator by either being formed into a continuous loop or by having reflecting end faces. Because of the photorefractive nonlinearity of the core, a modal competition will take place among the transverse modes in which one mode will dominate and suppress the oscillation of the other modes. Optical transforms such as holograms are used to associate unique patterns with corresponding modes. The dynamics of such resonator device is characterized by a chaotic instability whereby at high gain levels, the device exhibits chaotic modal oscillation. In a particular network configuration utilizing a plurality of such resonators the chaotic instability may be used for a dynamical type of annealing process in order to improve the performance of certain types of optimization computations, such as the traveling salesman problem.

In another embodiment of the invention, an optical resonator is formed by a special optical fiber assembly having a plurality of polarization preserving wave guide cores from which some light leakage is allowed. The fiber assembly has a cladding characterized by a quadratic index profile to produce a focusing effect such that the light escaping from any particular wave guide core will eventually be returned thereto. The cladding is also photorefractive so that gratings are formed to couple light between the wave guide cores. A resonant gain mechanism is also provided to permit direct optical amplification of light in various cores. As in the previous embodiment, the foregoing optical fiber assembly establishes a resonant cavity by either being formed into a continuous ring, or by having light exiting the cores through its end faces retroreflected back into the respective cores by mirrors or some other means. The resonant cavity fiber is coupled by couplers to a pump beam for optical amplification and is also coupled to an input signal source.

BRIEF DESCRIPTION OF THE DRAWING FIGURES

Other objects, advantages and novel features of the invention will become apparent from the following detailed description of the invention when considered in conjunction with the accompanying drawing wherein.

Figure 1:
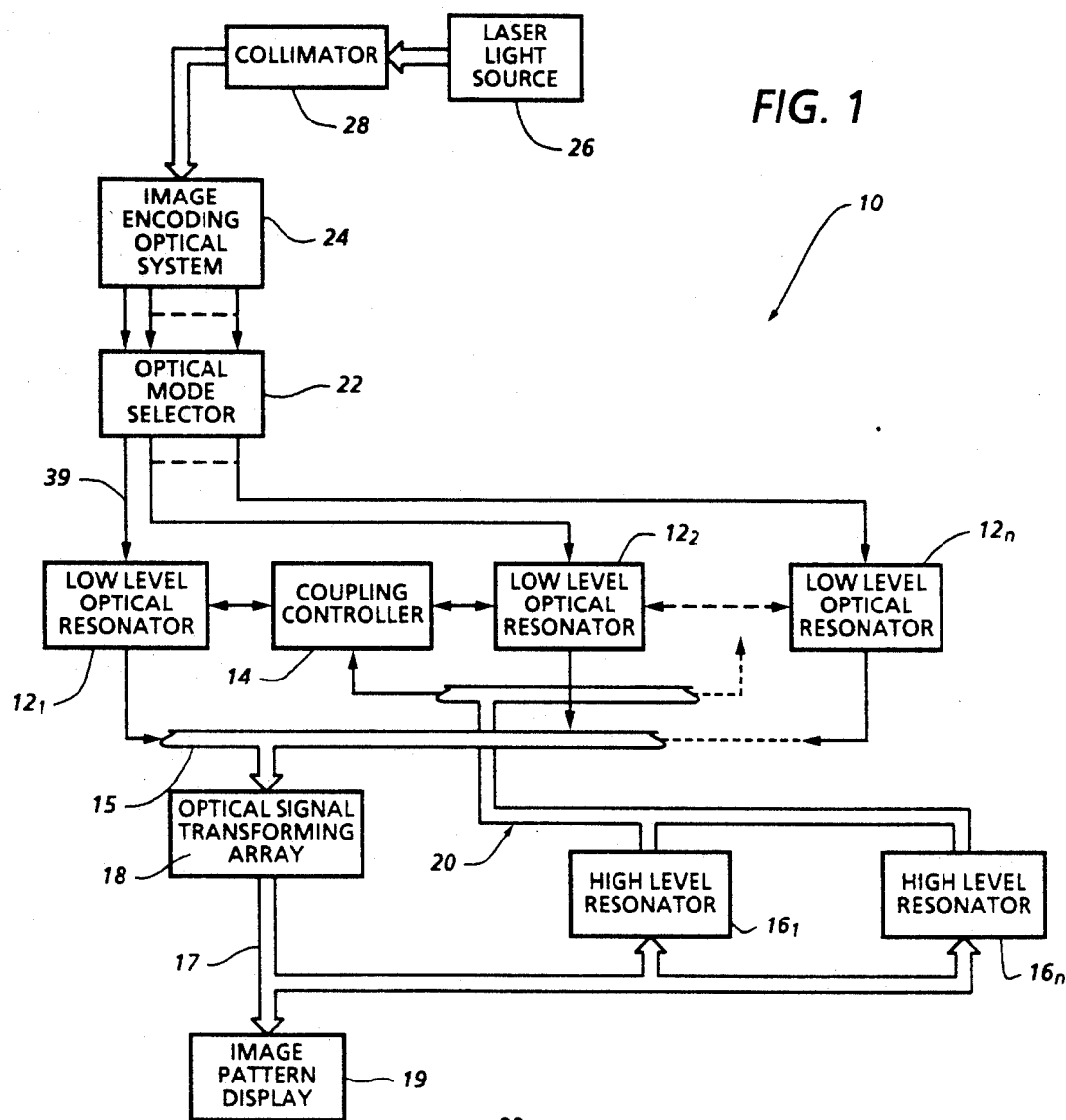
FIG. 1 is a schematic block diagram of an image pattern recognition system in accordance with one embodiment of the invention.
Figure 2:
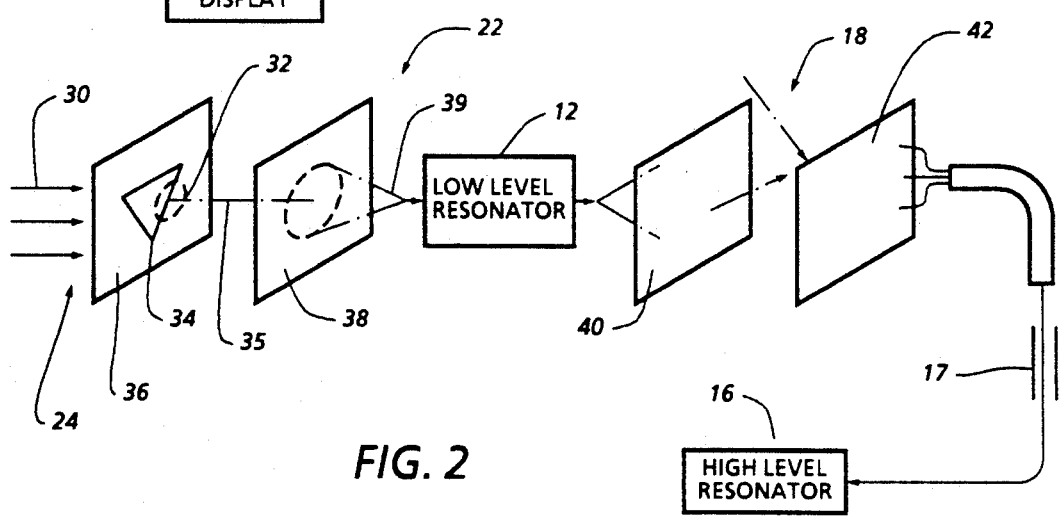
FIG. 2 is a schematic illustration of optical signal transmission associated with a single low level resonator and FIG. 3 is a partially schematic illustration of a low level resonator in the system diagrammed in FIGS. 1 and 2, in accordance with one embodiment of the invention.
Figure 3:
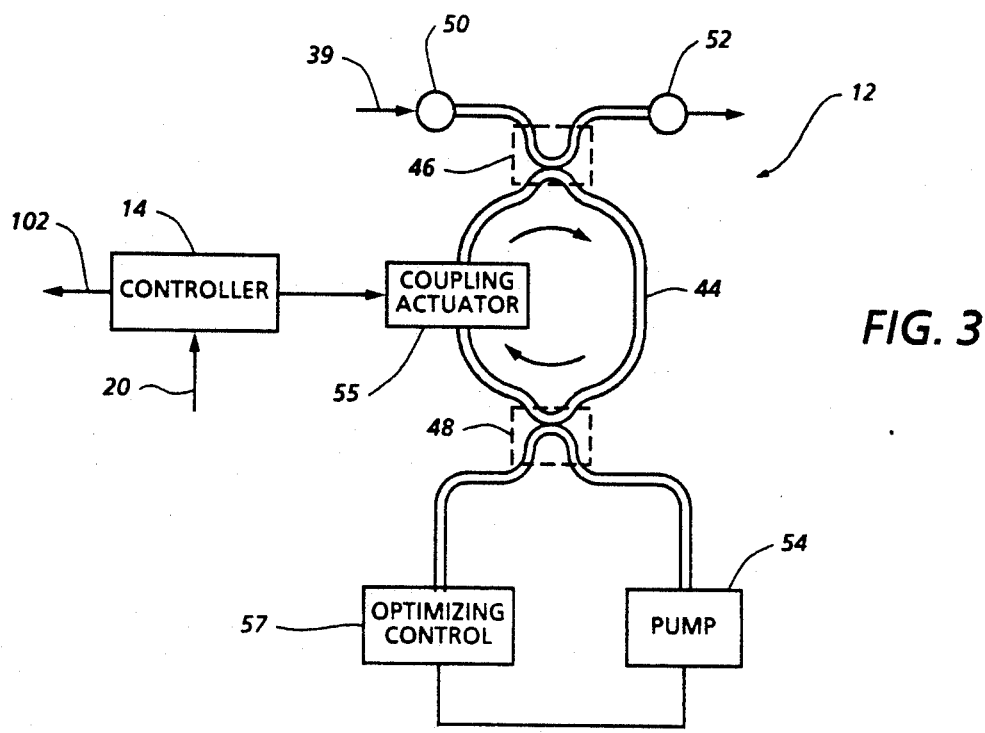
Figure 4:
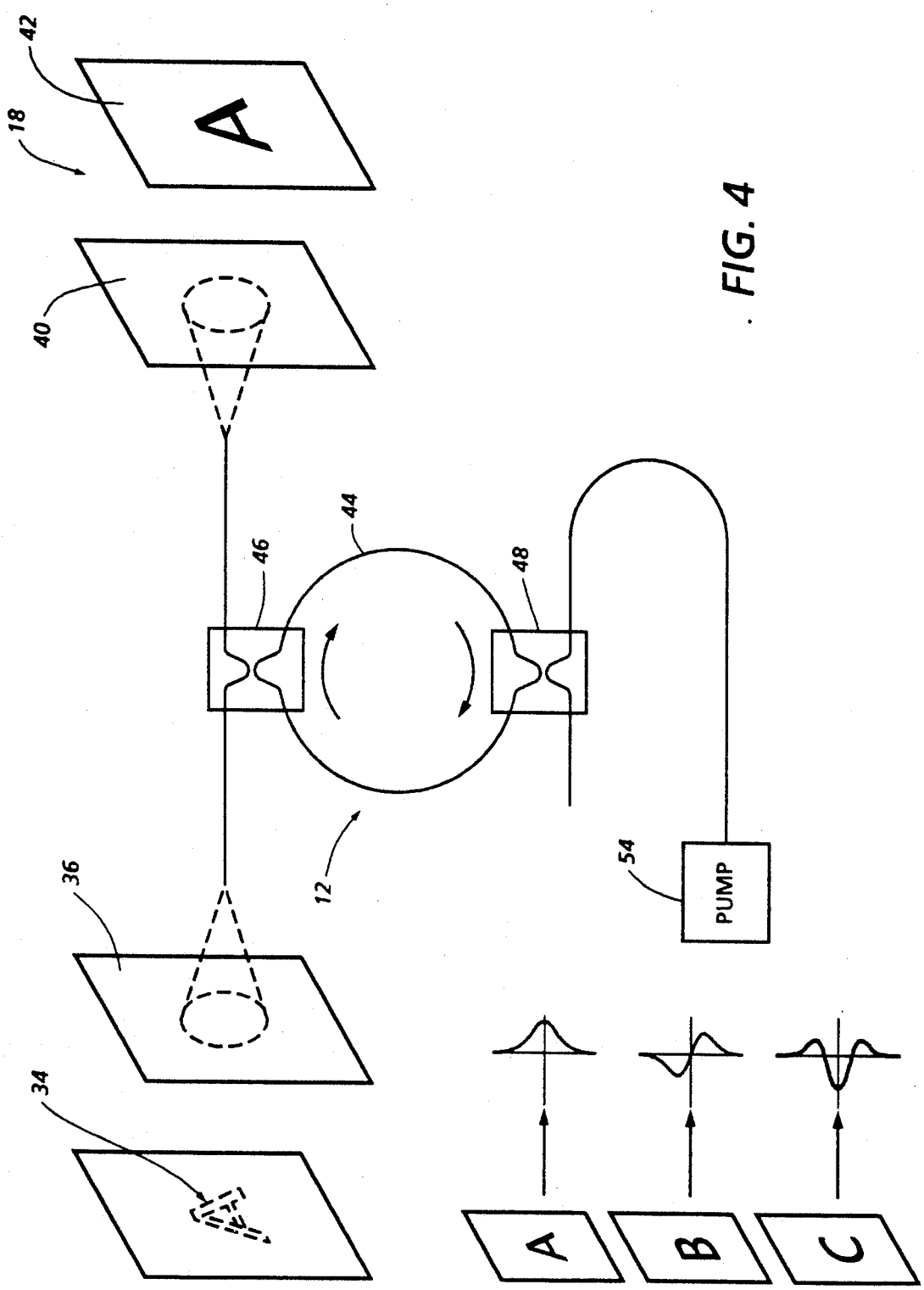
Figure 5:
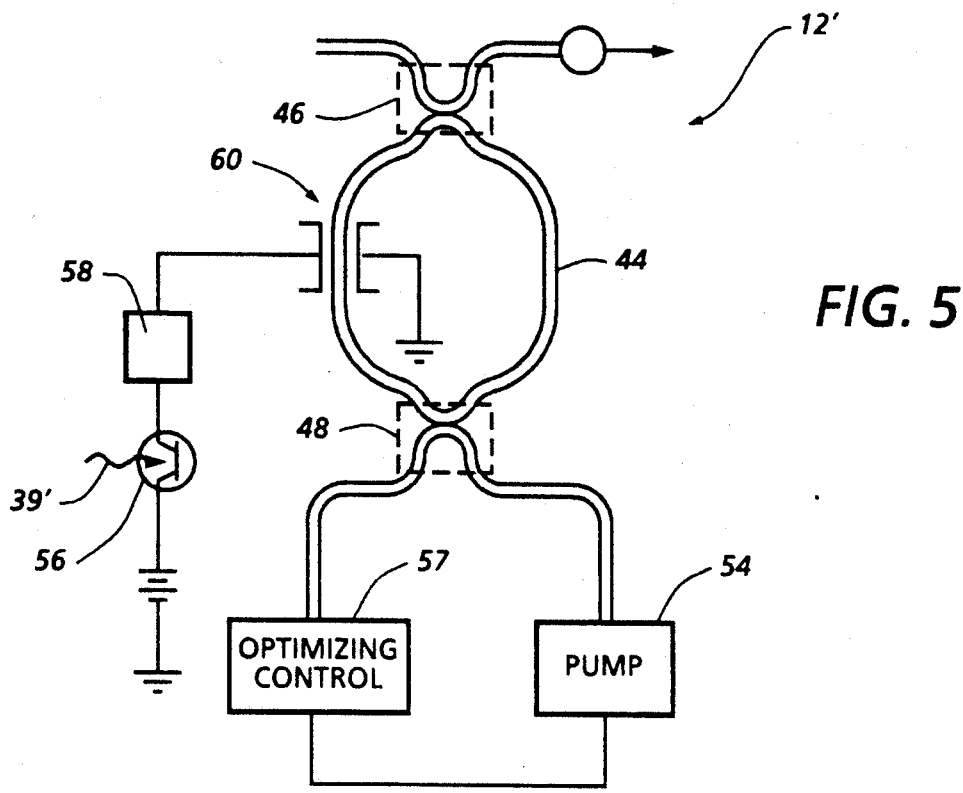
Figure 6:
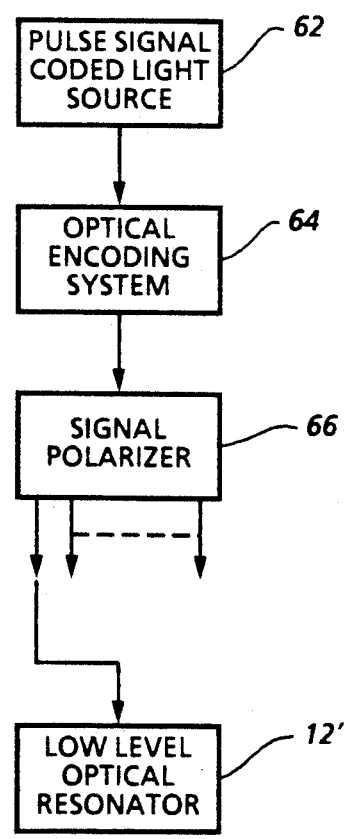
Figure 7:
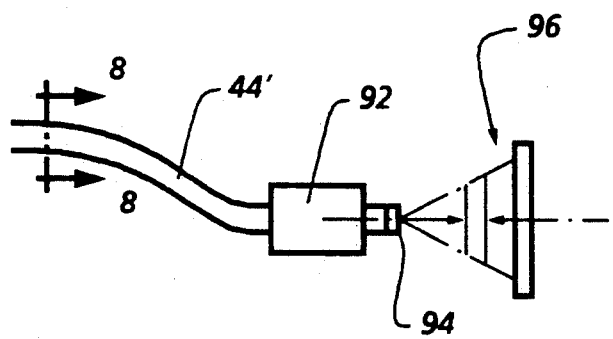
Figure 8:
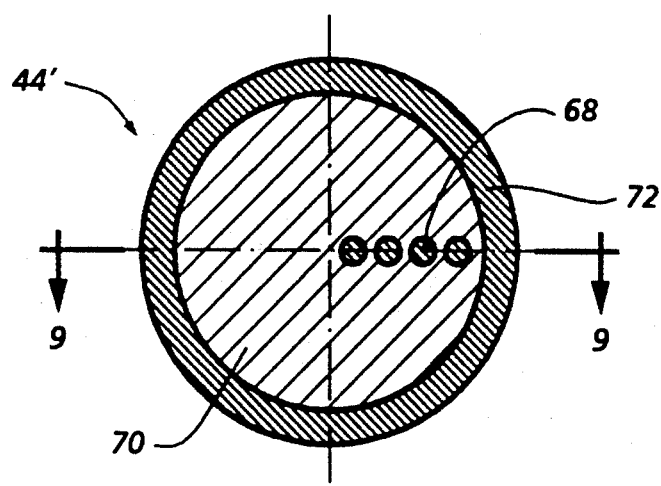
Figure 9:
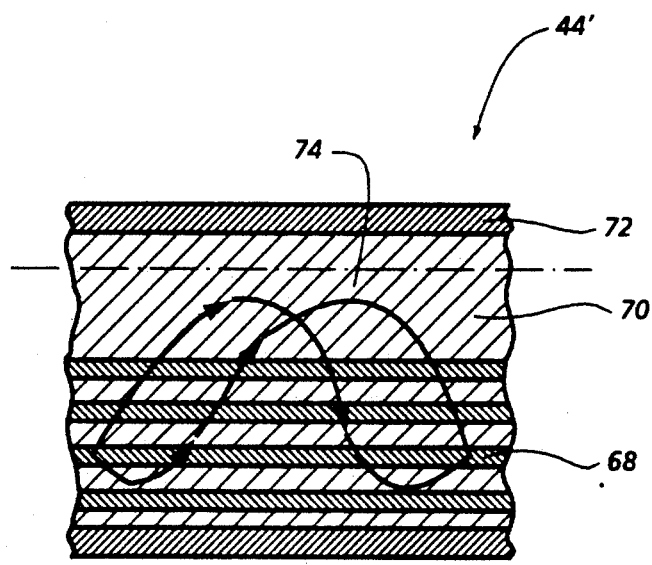
Figure 10:
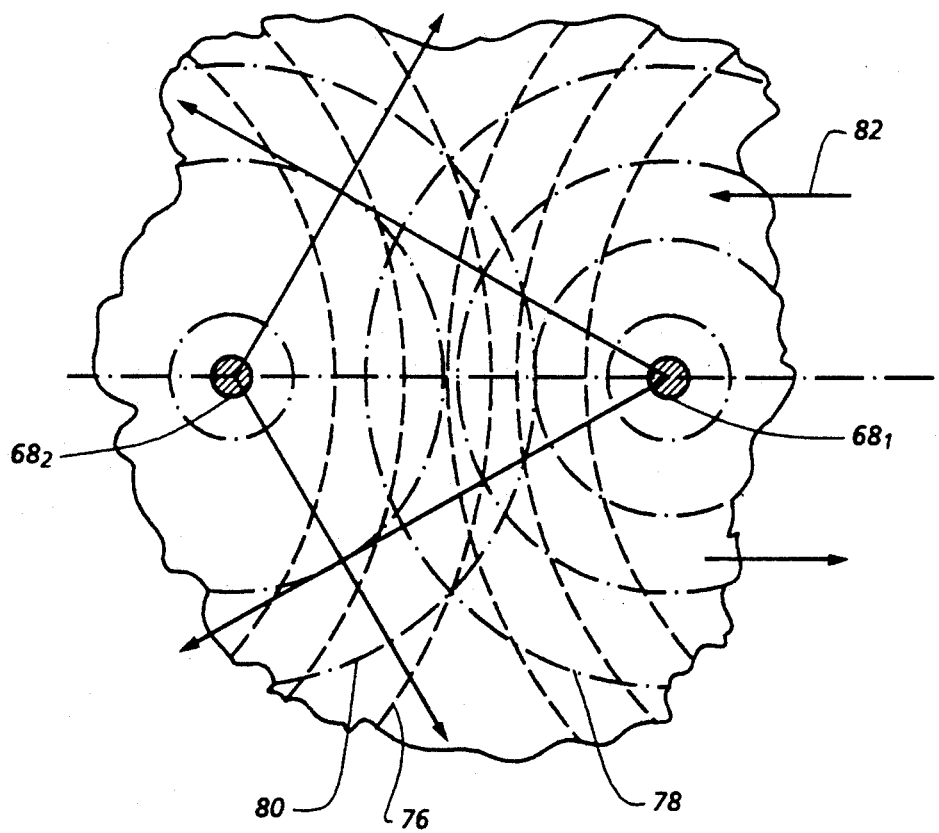
Figure 11:
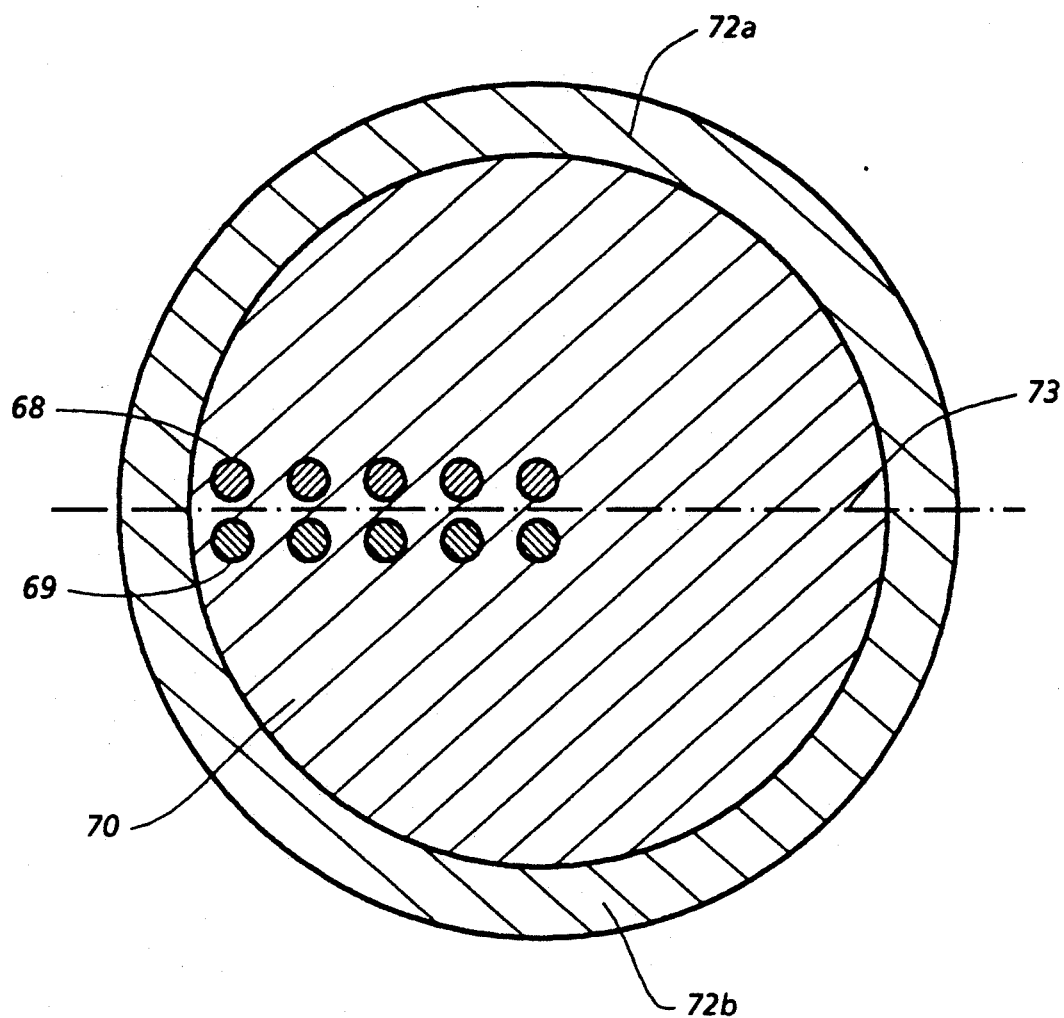
Figure 12:
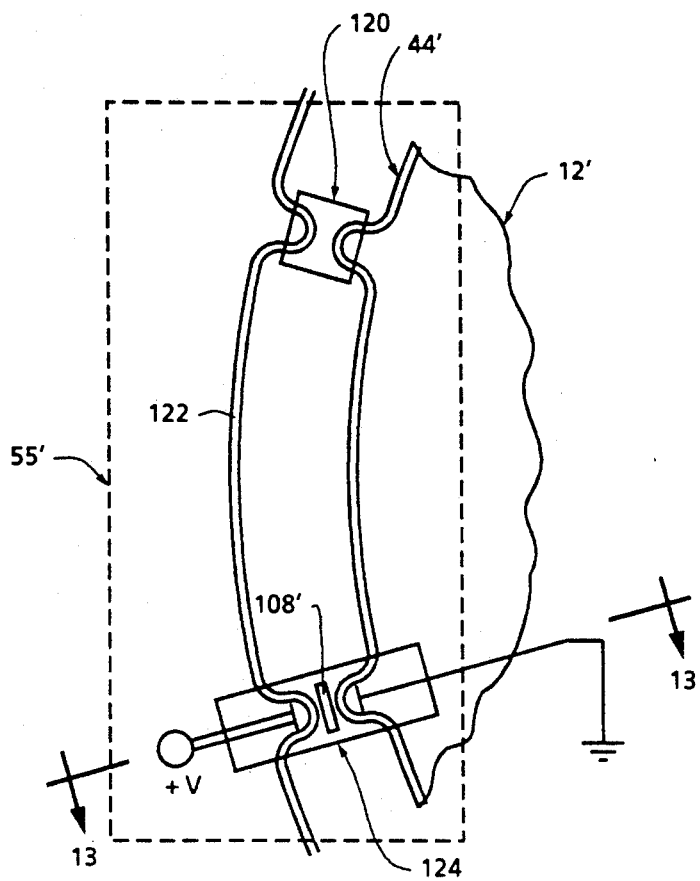
Figure 13:
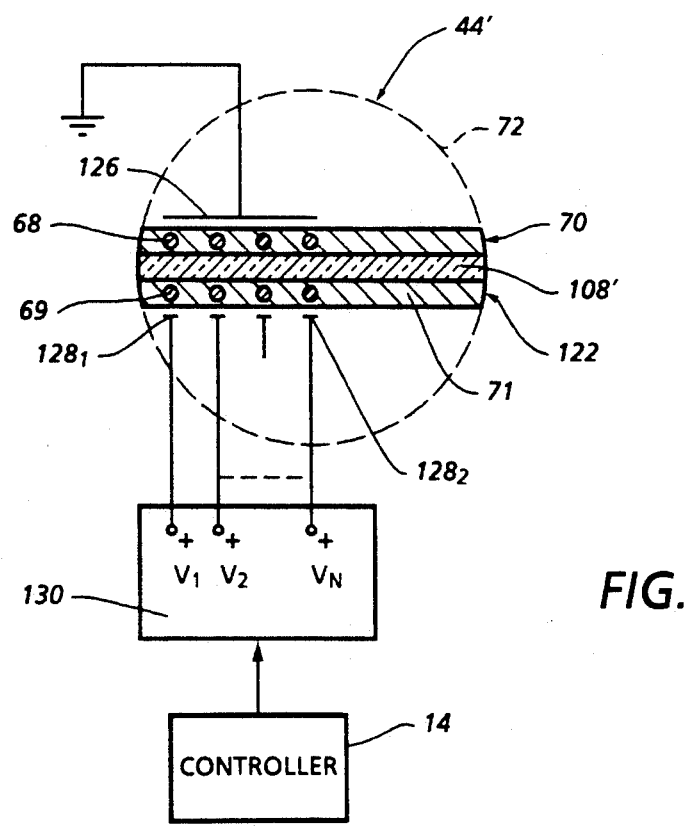

FIG. 4 schematically illustrates a variant of the system depicted in FIGS. 1 and 2, utilized as an associative memory device;

FIG. 5 is a schematic illustration of the low level resonator of FIG. 3 with a modification applied thereto;

FIG. 6 is a partial block diagram of a modified form of image pattern recognition system;

FIG. 7 is a partial view of a resonator associated with a non-loop embodiment;

FIG. 8 is an enlarged section view taken substantially through a plane indicated by section line 8—8 in FIG. 7;

FIG. 9 is a partial section view taken substantially through a plane indicated by section line 9—9 in FIG. 8;

FIG. 10 is an enlarged cross-sectional diagram of the resonator fiber shown in FIGS. 7-9, depicting the interaction of light emanating from adjacent wave guides;

FIG. 11 is a section view of a coupler used in conjunction with the embodiment of FIG. 8;

FIG. 12 is a partially schematic illustration of a variable coupling actuator in association with an optical resonator of the type depicted in FIGS. 7-10;

FIG. 13 is a section view taken substantially through a plane indicated by section line 13—13 in FIG. 12.

Figure 14:
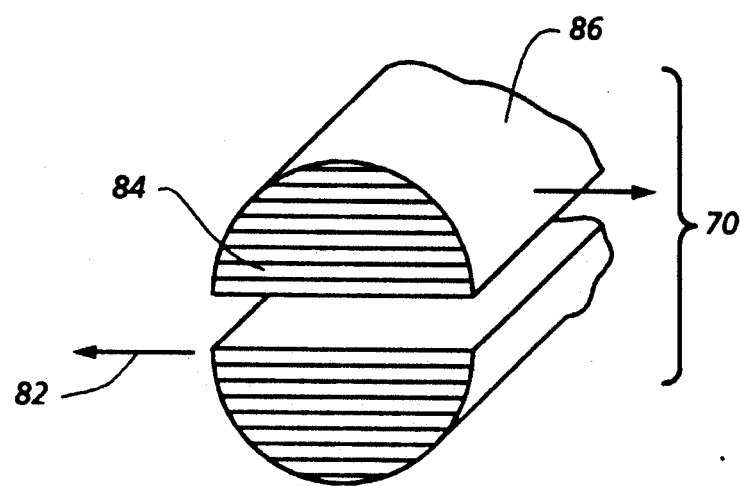
Figure 15:
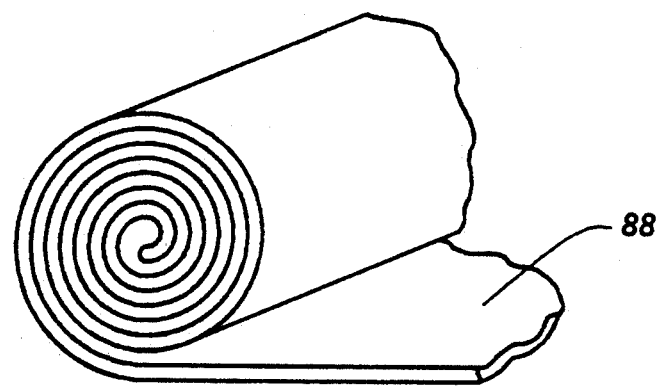
Figure 16:
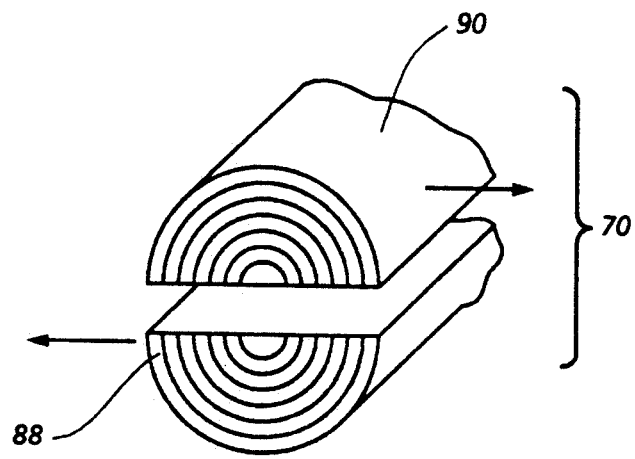
Figure 17:
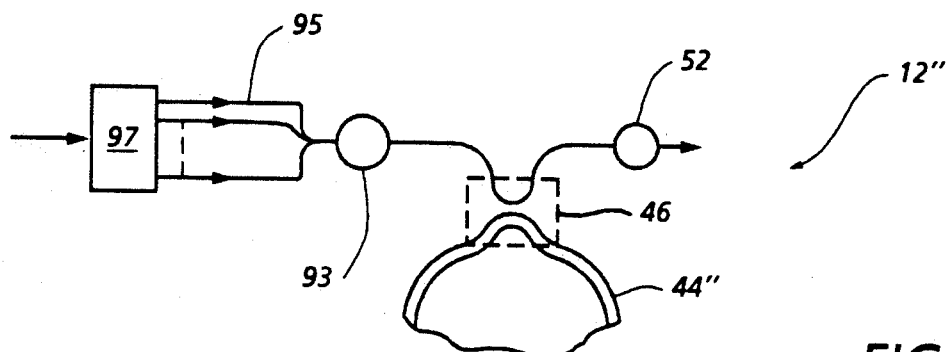
Figure 18:
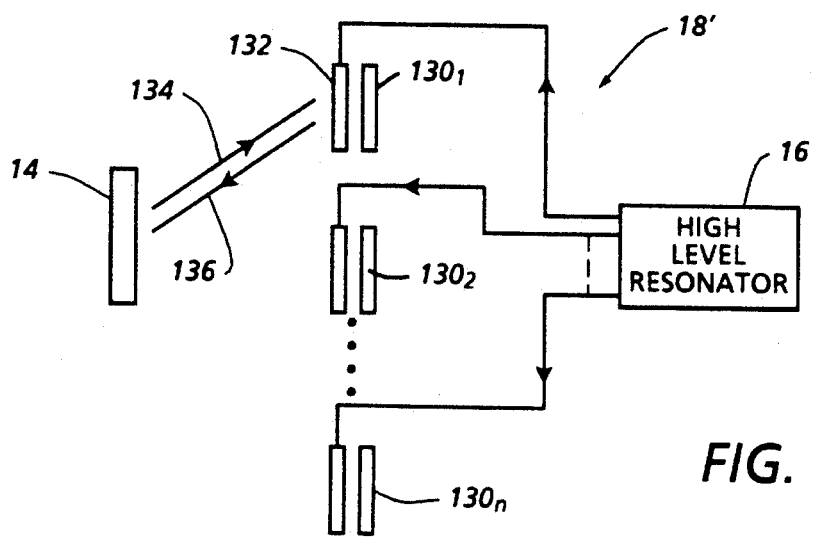
Figure 19:
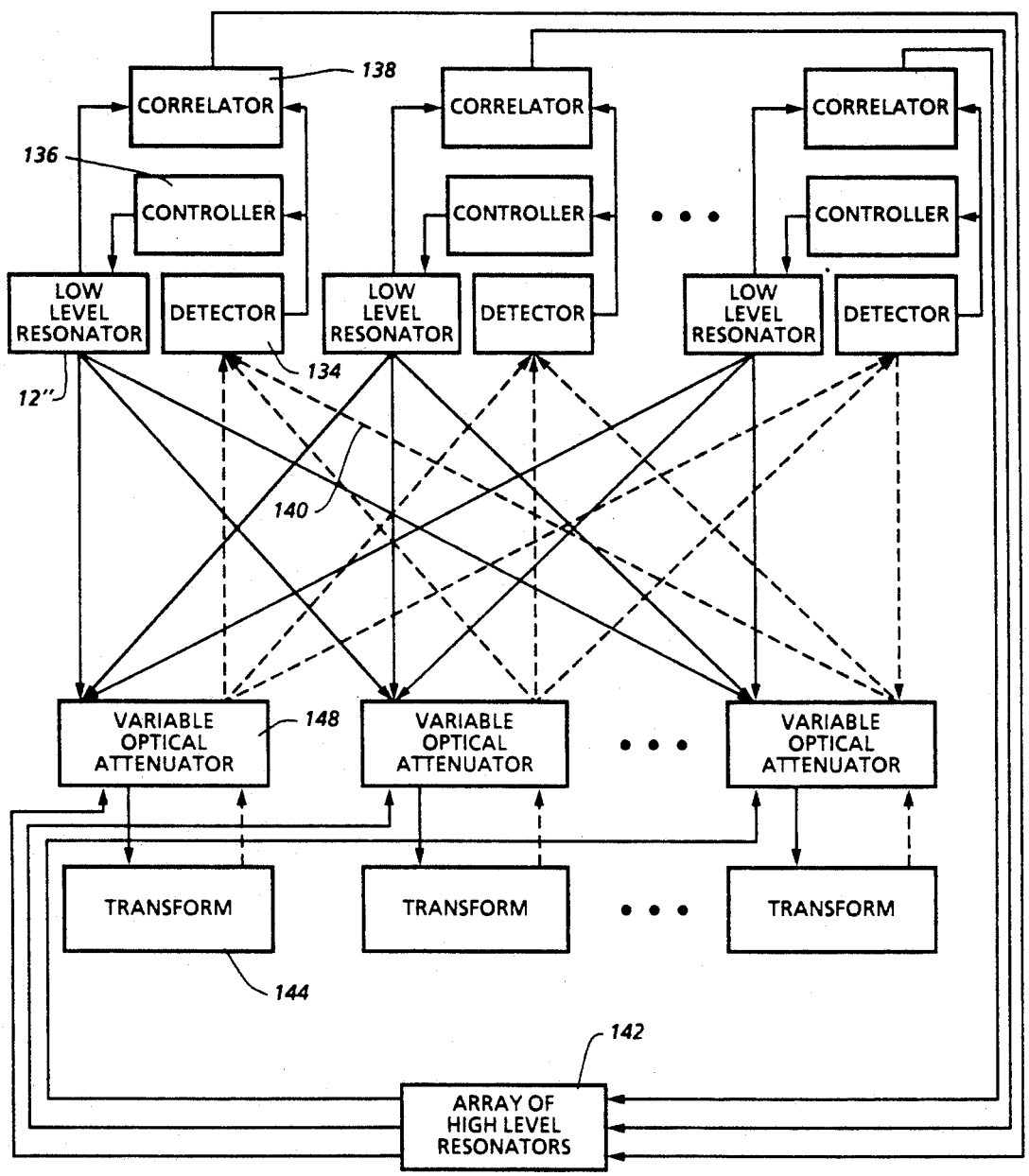

FIG. 14 is a partial perspective view of disassembled sections of the resonator fiber shown in FIGS. 7-9, being fabricated in accordance with one embodiment of the invention;

FIGS. 15 and 16 are partial perspective views of disassembled sections of the resonator fiber of FIGS. 7-9 being fabricated in accordance with another embodiment of the invention;

FIG. 17 is a partial view of a resonator within a system arrangement accordance with yet another embodiment of the invention;

FIG. 18 is a schematic diagram illustrating an optical signal transforming array for the system depicted in FIG. 1, in accordance with another embodiment of the invention; and FIG. 19 is a block diagram of an alternate architecture of that illustrated in FIG. 18.

DETAILED DESCRIPTION OF PREFERRED EMBODIMENTS

Referring now to the drawing in detail, FIG. 1 is a schematic block diagram of a pattern recognition system, generally referred to by reference numeral 10. As shown, the system 10 includes an array of low level optical resonators $12_1$, $12_2$... $12_n$. Each resonator 12 supports a family of oscillation modes. Coupling controllers 14 between the low level resonators cause a given low level resonator to favor a particular mode as a function of the adjacent low level resonator modal state and a modal state of a high level resonator in another array of resonators $16_1$... $16_n$. The image data outputs of the resonators 12 transmitted through a signal conduit 15, are respectively processed in an optical signal transforming array 18 for distribution through signal conduit 17 to the array of high level resonators 16 and to an image pattern display 19. The signal output of each high level resonator 16 is transmitted through a signal feedback conduit 20 to the coupling controllers 14, as shown, for modifying the modal interaction between adjacent low level resonators 12.

The low level resonators 12 have operational modes corresponding to different features or image components of a composite image derived from a field of view illuminated by a laser light beam from a CW laser source 26 expanded by an optical system such as a collimator 28. Subsequently the expanded beam is directed to optical image encoder 24, such as an electronically addressed spatial light modulator. The outputs of the encoder 24 are respectively fed to the low level resonators 12 through an optical mode selector 22 whereby image components are transformed into resonator mode profiles and then directed to their respective resonators 12. The outputs of the resonators 12 processed in the optical transform array 18 form the composite image readout through the image pattern display 19 as diagrammed in FIG. 1.

According to one embodiment of the invention as diagrammed in FIG. 2, laser light 30 originating from source 26, illuminates an image 34 formed in the plane of the encoder 24. A given component of such image at location 32 in the plane 36 of encoder 24 is sampled by the optical system 22 for association with a single low level resonator 12 having a field of view commensurate with location 32. Thus, different features of the laser light illuminated image 34 are respectively directed as optical signal inputs 39 from the optical transforms 38 of selector 22 to low level resonators 12 as diagrammed in FIG. 2, causing each to undergo a competitive gain process whereby the mode corresponding to the most intense input signal dominates and suppresses the oscillation of the other modes. The optical transform 38 transforms the image component or feature at 32 as a function of a particular property of the image component, such that depending on some variation of the property, the component is transformed to a modal pattern of a low level resonator 12 where the particular mode represents a particular variation of the component property. The signal output of a given low level resonator is spatially encoded by another optical transform 40 of array 18 in such a way that when encoded outputs from adjacent resonators 12 are combined in some image subtraction process or superposition process at plane 42, an optical signal will be produced representing the state difference between adjacent low level resonators 12. The image subtraction process can be implemented in a spatial light modulator, the details of which form no part of the present invention. The optical signals representing the state differences are then directed to one or more high level resonators 16 through conduit 17 as diagrammed in FIGS. 1 and 2.

The high level resonators 16 are identical to the low level resonators 12, except that the modal states of the high level resonators can represent various differences in orientation between image components such as the line segments of the image 34. Thus, recognition of an equilateral triangle type of image 34, for example, would be constituted by the presence of high level resonator modes representing 120° differences in line segment orientations.

A low level optical cavity resonator 12 hereinbefore referred to includes a polarization preserving, multimode optic fiber loop 44 according to one embodiment of the invention as diagrammed in FIG. 3. The loop fiber 44 has a dopant and is formed with opposite projecting formations to respectively form portions of evanescent types of signal and pump couplers 46 and 48. The signal coupler 46 receives the signal image input 39 at entrance aperture 50 to emit an output signal at exit aperture 52. Coupler 48 on the other hand interconnects the resonator 12 with an optical pump 54 which empowers the laser gain mechanism in association with the optical fiber loop dopants of the resonator 12 while a coupling controller 14 implements modal biasing in the resonator 12 through coupling actuator 55. The pump 54 is connected to an optimizing control 57 as diagrammed in FIG. 3 for purposes to the described hereinafter. The optical fiber of the resonator loop 44 is composed of a photorefractive type of nonlinear optical material in a ring as depicted in FIG. 3 in order to achieve wave mixing of the signal input and pump beams for signal amplification and modal coupling purposes. Amplification gain may be enhanced by the doping of the fiber ring 44 with a rare earth compound such as neodynium or erbium giving rise to stimulated emissions. Because of the nonlinear coupling resulting from the interaction between the various modes in the fiber ring 44, a transverse mode determined by the most intense initial input image component signal corresponding to that mode will predominate and suppress other modes when producing the modal output signal at exit aperture 52.

The modal outputs of the high level resonators 16, on the other hand, are directed to the coupling controllers 14, as aforementioned, for associative recall evolved over time by interaction between global and local information. Each coupling controller 14 affects the self saturation factors of various modes in adjacent resonators 12 as a function of the signal it receives from the high level correlator resonators 16 and adjacent low level resonators 12. A low level resonator 12 in an incorrect modal state, is thereby driven by its coupling controller 14 to a correct state. A null mode is provided to represent the absence of a line segment or feature at the location represented by the resonator.

Figure 3A:
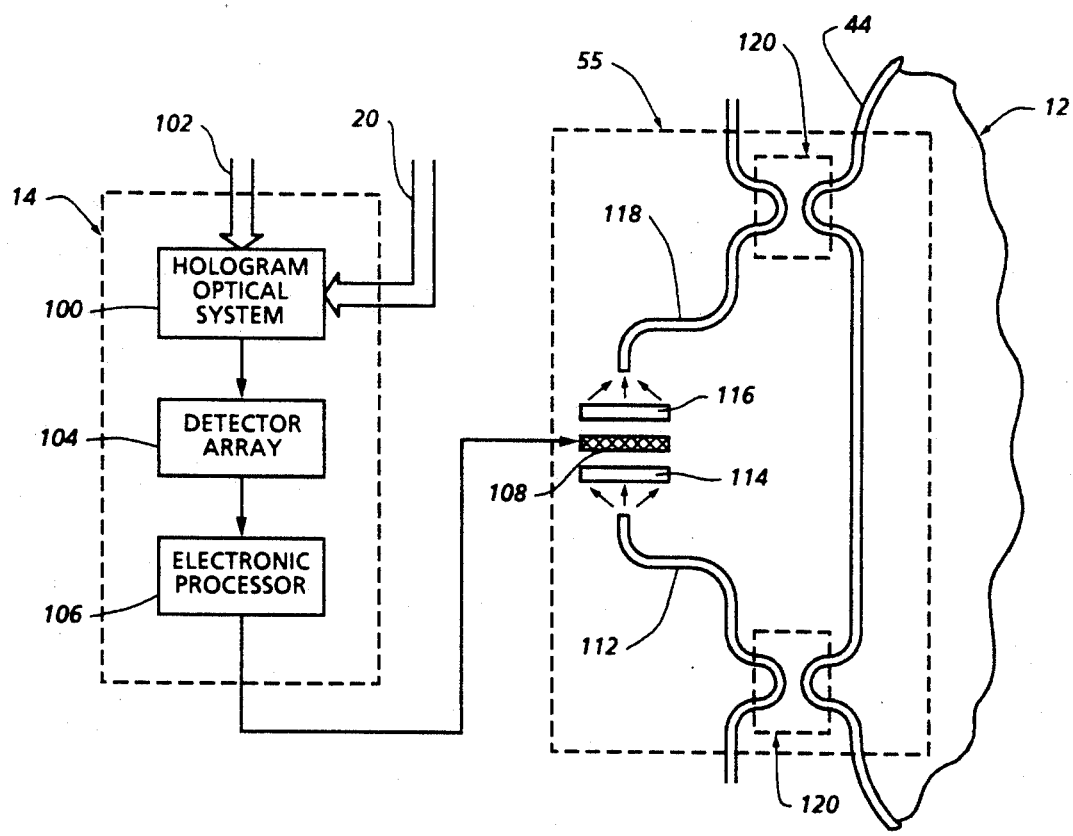
FIGS. 3A and 3B are partially schematic illustrations of optical control arrangements associated with the low level resonators depicted in FIG. 3, in accordance with different embodiments of the invention.

With continued reference to FIG. 3, the coupling controller 14 in conjunction with the coupling actuator 55 operates to lower the self saturation factor of a particular mode favoring that mode of a particular resonator 12 depending on the states of the other resonators interconnected therewith through the controller 14. For use with a single multimode wave guide implemented resonator, the controller 14, as diagrammed in greater detail in FIG. 3A, includes an optical system such as a hologram 100 which directs signal beams from an adjacent low level resonator in conduit 102 and signal beams from high level resonators 16 in optical conduit 20 onto a photo-detector array 104. Signals thereby obtained from various detectors of the array 104 are fed to an electronic processor 106 of the controller 14. The signal output of processor 106 is fed to a spatial light modulator 108 in the coupling actuator 55 in order to controllably vary its light transmissivity over its area. By lowering the transmissivity in a spatial pattern that corresponds to a particular transverse mode, light propagating in that mode encounters greater attenuation relative to the other transverse modes. As a result, the formation of self saturation gratings in fiber ring 44 will be impeded relative to the other modes.

The coupling actuator 55 includes a coupler 120 through which light is extracted from the optic fiber ring 44 of resonator 12 and conveyed by an optic fiber lead 112 to an optical system such as hologram 114 directing the light through the spatial light modulator 108 aforementioned. The light traversing modulator 108 is focused by another optical system 116 into another fiber optic lead 118 for return through another coupler 120 to the optic fiber ring 44. Under control of processor 106, the transmissivity of the modulator 108 is varied to transmit, to a lesser extent, extracted light in a particular propagation mode driving self saturation closer to zero relative to other modes. Such lowering of light transmissivity in the coupling actuator reduces the intensity of a grating in the main loop of ring 44 that retards the oscillation for that particular mode. The coupling actuator 55 normally has a high transmissivity for all modes. The fiber optic leads 112 and 118 introduce a phase change to the light beams from each resonator mode so that gratings having the foregoing resonance interference property are formed when the light from the fiber optic ring 44 is recombined with the resonator beam therein thus retarding uniformly the oscillation of the various modes.

Each of the resonators 12 and 16 is of a type which incorporates a material of photorefractive non-linearity within the waveguide or cladding volume and embodies a mechanism enabling the achievement of optical gain by waveguide doping with the appropriate material. Such arrangements give rise to coupling gratings that couple by Bragg scattering light from one mode into another mode. The magnitude of a grating coupling any two modes is proportional to the integral of the product of the slowly varying modal amplitudes of those modes. If the power imparted to the resonator through its pump beam (as hereinbefore described with respect to FIG. 3) is increased beyond a certain threshold, chaotic modal competition will be exhibited. Such chaotic behavior is analogous to a prior art noise problem associated with an annealed Hopfield network. The foregoing problem is solved in the environment of the present invention by selection of an optimizing variation in power level or beam focus for dynamic annealing purposes. Thus, the pump beam for each resonator when increased in power level or focus above the chaos level, is thereafter varied over time according to an annealing schedule through the optimizing control 57 diagrammed in FIG. 3. At the end of such schedule, the pump beam is lowered in power level or defocused below the chaos threshold so that the system may settle on a stable pattern.

Figure 3B:
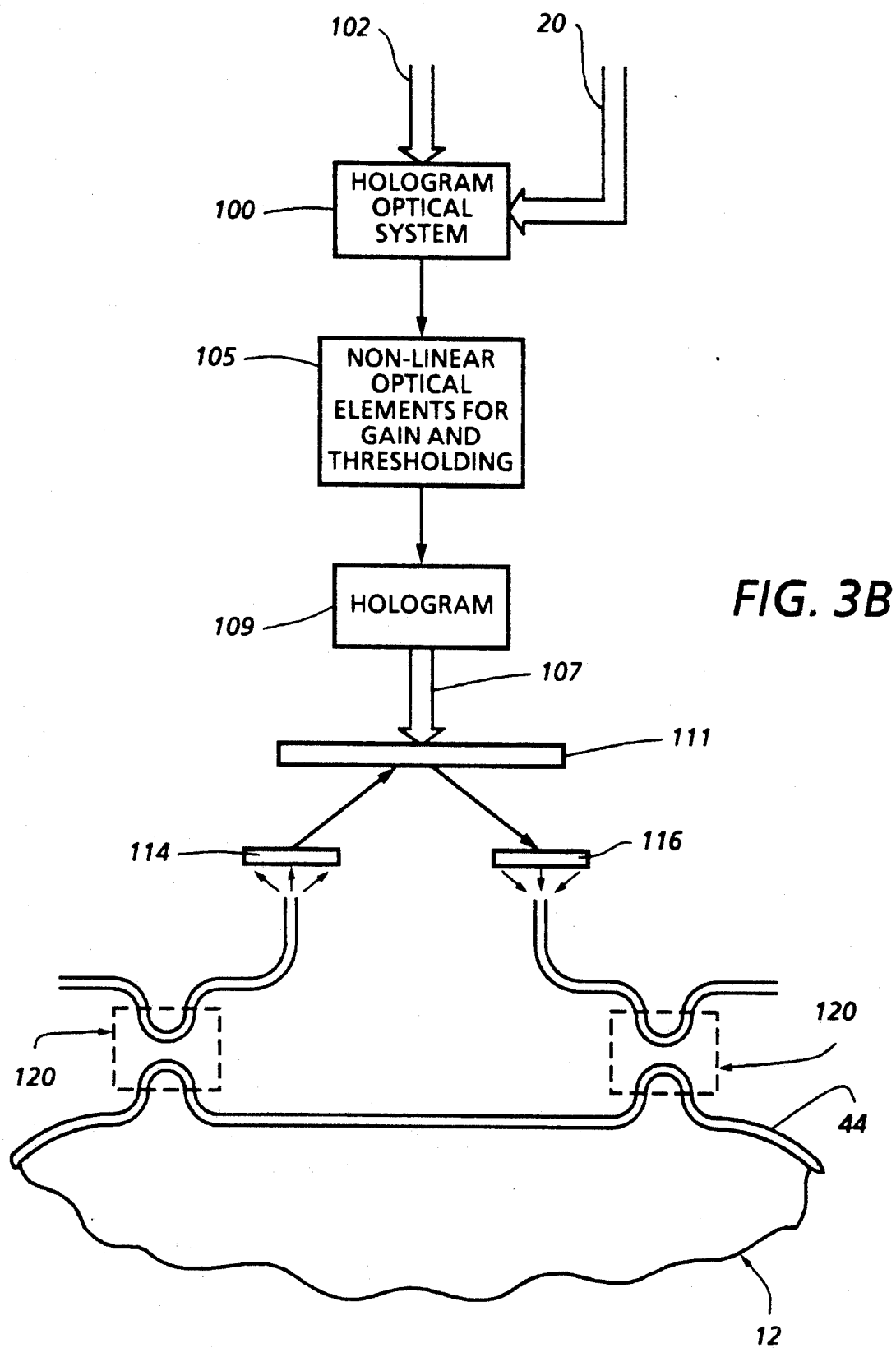

FIG. 3B illustrates yet another embodiment in which the detector array 104 and electronic processor 106 of the controller 14 are replaced by a system 105 of nonlinear optical elements performing gain and thresholding functions to transform the incoming signals from hologram 100 into a control beam 107 through a hologram 109. The control beam 107 is directed onto an optically addressed spatial light modulator 111. The reflectivity of the modulator 111 is thereby varied so as to correspond to a selected mode of the resonator 12 having its fiber ring 44 operatively associated through couplers 120 and optical systems 114 and 116 with the light modulator 111. The resonator 12 is accordingly biased to favor oscillation in the selected mode.

An implementation of a single low level resonator as an associative memory is illustrated in FIG. 4, corresponding to the arrangement depicted in FIGS. 1, 2 and 3. An input image 34 is transformed by a hologram 38 into a modal pattern and directed into a fiber optic loop resonator 12. The hologram 38 uniquely transforms various patterns into corresponding transverse modes. In this implementation the coupling controller and coupling actuator are not required. From the previously described dynamics, one particular mode dominates and suppresses the oscillation in the other modes. A second hologram containing the inverse transforms of the first hologram transform the output signal to its corresponding pattern. This device will restore a noisy or incomplete input images to their correct form demonstrating associative recall.

In accordance with the present invention, the output signals from low level optical resonators 12' of another embodiment as diagramed in FIG. 5, represent ima9e feature orientations derived from a spatial pattern of light which uniquely corresponds to specific resonant frequencies of the resonator. Signal input 39' would then be received by a detector 56 associated with each low level resonator 12' to control through electronics 58 electro-optic wave guide 60 incorporated into the fiber optic ring 44 of the resonator. Different orientations of image line segments would result in different voltages applied to the electro-optic waveguide and thus through the electro-optic effect correspond to different optical path lengths in the resonator, giving rise to different resonant frequencies representing such image line segments. In the dynamics of this resonator, the different resonant frequencies would be analogous to the transverse modes in the previous embodiment.

According to still other embodiments of the invention, a particular resonant frequency mode may be selected with respect to low level resonators 12' for image pattern recognition purposes by means of illumination of the image being monitored with pulsed light from a source 62 as diagrammed in FIG. 6. The pulse coded light is directed to arrays of fiber optic image encoders 64 as disclosed in my prior copending application, Ser. No. 07/553,058, filed Jul. 16, 1990. The output of system 64 representing an image line segment for example, is processed by a signal polarizer 66, as diagrammed in FIG. 6, to generate a composite pulse or pulse train output as some function of the line segment orientation. Since the pulse encoded orientation outputs of polarizer 66 have different delay lengths, they are separated from one another within the local resonator 12' because of fiber non-linearity causing propagation of the composite pulses through its fiber ring 44 with different velocities. Light coincidence with the pulse having a gain function will be amplified accordingly so that one wavelength will eventually dominate and correspond to the line segment orientation being monitored. According to this embodiment, null modes for the local resonators 12' may be supported by doping of the fibers of rings 44 with a substance establishing an ultra-narrow linewidth resonance corresponding to a cavity length of the ring at which resonant wavelength light is absorbed to preclude oscillation. Recognition of particular orientations is thereby made possible through detection of beat frequency by the high level resonators 16 in a pattern recognition system otherwise similar to that diagrammed in FIG. 1. Thus, the modal states of the high level resonators 16 will correspond to high beat amplitude oscillation of the beat frequency. The low beat frequency oscillation outputs of the resonators 16 transmitted by the optical conduit system 20 to each low level resonator 12' may therefore involve the use of electro-optic modulation in conjunction with beam directing optics.

FIGS. 7-10 illustrates another embodiment of an optical resonator which features an optical fiber assembly 44' having a plurality of elongated wave guide cores 68 embedded in a photorefracture body 70. The cores 68 are made of a transparent and flexible material having a refractive index allowing some escape of light and are radially aligned in off-center relation to the cross-section of the photorefractive body 70. An outer sheath 72 encloses the body 70 as shown. Because of the quadratic index gradient of the body 70, light escaping from one of the cores 68 will eventually be directed back to the core from which it originated. Thus, a split beam denoted by curved paths 74 in FIG. 9, emanating from one core will converge and diverge relative to such core as diagrammed.

FIG. 10 diagrams the interaction of light between adjacent cores $68_1$ and $68_2$ within the optical fiber assembly 44' wherein gratings 76 are formed between the light beams respectively escaping from the cores as indicated by the light beam phase fronts 78 and 80. Such gratings are formed because of the use of a photorefractive body 70 as aforementioned causing the light emanating from the cores 68 to be Bragg scattered by a photofractive grating from one path to another for transfer from one core into another. Such photorefractive effect of the cladding is dependent on the poling of its material, and determines the direction of the electro-optic tensor 82 in FIG. 10. In order to permit symmetric coupling, poling is chosen to be perpendicular to the direction of the propagation and yet parallel to the wave guide plane pointing in opposite directions above and below such plane as indicated by arrow 82 in the FIG. 10.

Since the aforesaid beam coupling action is proportional to the intensity of the light respectively propagated through the cores 68, eventually one core will dominate and suppress oscillation in the other cores because of competitive gain dynamics as hereinbefore described with respect to FIG. 3. The dynamics of the waveguide interaction are analogous to the modal coupling dynamics associated with the first embodiment. In the embodiment of FIGS. 7-10, the competitive gain dynamics is due to non-linearity of the waveguide coupling, manifested by attainment of coupling cross saturation before coupling self saturation is attained. Such coupling may be implemented by weighting self coupling differently from cross coupling similar to the first embodiment. Beam coupling may also be utilized to provide gain within fiber assembly 44' with a pump beam of higher intensity than the input signal beam. Stimulated emission gain may be implemented by doping the cores and/or cladding of the fiber assembly as hereinbefore described with respect to FIG. 3. The input/output leads may be coupled into the resonator by junctions formed by removing the cladding 72 shown in FIG. 8 along a section below the waveguide plane 73 of the input/output lead and correspondingly above the waveguide plane of the resonator loop and then joining the sections 72a and 72b of such cladding so the respective waveguides line up. Such a junction is illustrated in FIG. 11 wherein waveguide cores 68 are located above the waveguide plane while waveguide cores 69 are below such plane.

The low level multicore wave guide resonator 12' with a fiber optic ring 44' as hereinbefore described may also be utilized in the pattern recognition system through a variable coupling actuator 55' in association with a controller 14 of the type hereinbefore described with respect to FIG. 3. The coupling actuator 55' as shown in FIGS. 12 and 13 includes a standard coupler 120 between the ring fiber 44' of the resonator 12' and an optical fiber lead 122 through which extracted light is conveyed. The fiber lead 122 is also coupled to the ring fiber 44' through a variable coupler 124 having an element 108' made of electro-optical material between the bodies 70 and 71 of the ring fiber 44' and fiber lead 122, respectively, as shown in FIG. 13. Within the coupler 124, the cladding of the resonator fiber 44' and lead fiber 122 are removed so as to permit close spacing of a common ground electrode 126 to the wave guide cores 68 within fiber body 70 and close spacing of the electrodes $128_1$, $128_2$...$128_n$ to the respective waveguide cores 69 within fiber body 71 of lead 122. The electrodes 128 are respectively connected to positive voltage terminals $V_1$, $V_2$...$V_n$ of a controllable power supply 130 under control of a controller 14. An associative memory implementation of a single resonator of this type, analogous to that illustrated in FIG. 4, can utilize a hologram that maps various patterns into corresponding waveguide cores in the input lead of the resonator while a second hologram contains the inverse transformation which is applied to light exiting the various cores in the output lead.

The photorefractive body 70 hereinbefore referred to may be fabricated from the thin films 84 of poled photorefractive polymer material laminated together to form a half cylinder 86 as shown in FIG. 14. Each laminate is doped with a controlled amount of dopant as a function of position to produce a quadratic index variation when laminated. Two of such laminated half cylinders 86 of opposite poling are then assembled to form a whole photorefractive body 70.

An alternative method of fabricating the photorefractive body 70 involves rolling a sheet 88 of photorefractive material into a cylinder, as shown in FIG. 15, after doping to provide for quadratic index variation. The cylinder so formed is then cut into halves 90 as shown in FIG. 16. The cylinder halves are joined together after being poled in opposite directions as shown by the arrows. Poling may be accomplished by applications of heat and electrical fields. Holes are then drilled in the cylindrical body so formed, parallel to its axis and in the plane along which the halves 90 are joined, for receiving the cores 68. Such assembly of cylinder halves 90 and cores 68 are then heated and stretched to complete fabrication of the optical fiber assembly 44'. A variation of the above technique may be utilized to fabricate the multimode single waveguide embodiment illustrated in FIG. 3.

The ends of the fiber assembly 44' may be joined to form a continuous ring with input signal and pump couplers as described with respect to FIG. 3. Alternatively, a non-loop configuration may be implemented with mirrors on each end of a fiber assembly 44' as shown in FIG. 7. The end faces of fiber 44' are also coated with transparent materials having different indices of refraction to create a multilayer coating 94 of alternating refraction indices to form a mirror. Alternatively, a hologram may be utilized to form a phase conjugate mirror 96. Due to direction of propagation dependency of the photorefractive coupling effect, a non-reciprocal polarization rotator 92 as shown in FIG. 7, such as a Faraday rotator, is provided in order to restrict photorefractive effect to one propagation direction by controlling the polarization as a function of direction. A complete resonator utilizing the fiber 44' in the non-continuous loop configuration of FIG. 7 is coupled to a pump beam as described with respect to FIG. 3.

According to yet another embodiment as diagrammed in FIG. 17, a low level resonator 12" in a pattern recognition system has an optic ring fiber 44", as previously described, doped with a rare earth element to provide or enhance gain. A star coupler 93 in conjunction with a standard coupler 46 connects the ring fiber 44" at one point to a plurality of input leads 95 made of a special type of non-linear material. An optical transform 97 encodes a pulsed input beam containing an image or an image component as a unique spatio-temporal propagation mode in a corresponding lead as a function of the image segment orientation. The nonlinearity of the leads is such that light is accordingly propagated through the respective leads 95 at a velocity proportional to input light intensity, with each lead being coupled by coupler 93 to the ring fiber 44" with respect to different modes representing the different image segment orientations. The mode corresponding to the most intense input pulse will therefore arrive first at the fiber 44". By employing gain saturation in conjunction with a lag time for reinversion of the excited state population, the mode corresponding to the most intense input will therefore receive proportionally more and more gain leaving less and less gain for the trailing modes so as to modally predominate and suppress the oscillation of the other modes. The velocity dependent nonlinearity may be incorporated into the loop resonator itself to enhance its performance.

FIG. 18 diagrams the architecture of another optical signal transforming array 18' between the arrays of low level and high level resonators, in accordance with another embodiment of the invention. The array 18' includes a plurality of holographic transforms $130_1$, $130_2$...$130_n$. The intensity of the light transmitted through each transform 130 is controlled by an associated optical variable attenuator such as a liquid crystal light valve 132. The optical transmittance of each attenuator is directly proportional to the corresponding mode of a high level resonator 16 to which it is coupled as diagrammed in FIG. 18. The transformed signals emerging from the array 18' are fed back to the array of low level resonators as diagrammed in FIG. 1 through the coupling controllers 14. Within each low level resonator, the signal output emerging therefrom and the transformed signal feedback from the spatial light modulators 132 of array 18', respectively denoted by arrowed lines 134 and 136 in FIG. 18, are correlated. Each optical transform 130 furthermore introduces a tag signal component to the feedback 136 so as to distinguish between transforms 130 of the array without interfering with the action in each coupling controller 14 correlating the signals of the emerging output 134 directed to the high level resonators 16 through array 18' in order to achieve the dynamic process hereinbefore described whereby one operational mode will dominate to suppress the other modes. Thus, one of the variable optical attenuators 132 associated with one of the transforms 130 of array 18', corresponding to a particular mode, will exhibit high transmissivity while the other variable optical attenuators will exhibit low transmissivity.

The aforementioned tag signal could be a high spatial frequency component added to the transformed low level resonator signal 136 by 130 where different spatial tag frequencies are uniquely associated with the transforms 130 of array 18'. Alternatively, tagging of the transforms may be achieved by temporal modulation of associated variable optical attenuators 132 at different frequencies. In the latter case, the high level resonator 16 would control the envelope of modulation while the output directed thereto is an optical signal proportional to degree of correlation unique to each transform 130.

For the triangle image input example as hereinbefore described with respect to FIG. 2, each of the low level resonators assumes a state corresponding to a line segment representative of a limited area of the image field. Each high level resonator 16 thus controls the optical transforms 130 of array 18' in performing image rotation in accordance with degree of correlation, with 120° corresponding to the highest degree of correlation. The high level resonator 16 will thereby cause the spatial light modulator 132 associated with the 120° rotation to exhibit high transparency. The foregoing operational example involves auto-association as hereinbefore described, and requires that the input image be centroided in the array of low level resonators by means of standard centroiding algorithms as presently known in the art.

FIG. 19 is a block diagram of the architecture associated with the low level resonators 12" depicted in FIG. 17. An array of the low level resonators 12" is shown wherein each resonator 12" has associated therewith a detector 134, a controller 136 and a correlator 138. Return signals 140 from the transforms 144, represented by dashed arrows are sampled by the detectors from which outputs are directed to the controllers 136. Each controller 136, depending on the tag signals, adjusts the self saturation of the various low level resonator modes accordingly for a particular low level resonator 12". The detector outputs are also directed to correlators 138 which sample the outputs from associated low level resonators 12". The output signal from a particular correlator 138 is a function of the correlation of the low level resonator output and the detector output. The correlator output signal is fed to a high level resonator of an array 142. This signal is encoded so that correlations of distinct rotational transforms 144 excite corresponding high level resonator modes. As previously explained, the attenuation of various variable optical attenuators 146 is a function of the intensity of a corresponding high level resonator mode. A winner take all dynamical process will cause a particular high level resonator mode to dominate and suppress the oscillation of the other modes thus permitting high throughout of signal through only one transform 144.

Numerous other modifications and variations of the present invention are possible in light of the foregoing teachings. It is therefore to be understood that within the scope of the appended claims the invention may be practiced otherwise than as specifically described.

I claim:

1. In an image data processing system having an optical resonator cavity device and coupler means operatively connected to the resonator cavity device for propagation of optical waves therethrough, the improvement residing in formation of said resonator cavity device by a multimode optical fiber and means coupled to the fiber for establishing predominant propagation of one of said optical waves therethrough in a selected operational mode of the resonator cavity device corresponding to image data.

2. The combination of claim 1 wherein said optical fiber is made of a non-linear photorefractive material.

3. The combination of claim 2 including a dopant applied to the optical fiber enhancing stimulated emission gain during said predominant propagation of said one of the optical waves.

4. The combination of claim 3 wherein said dopant establishes ultra-narrow linewidth resonance within the resonator cavity device at a resonant frequency corresponding to a null mode during which substantially all of the optical waves are absorbed.

5. The combination of claim 4 wherein said coupler means includes optical wave guide means for optical path length adjustment of the resonator cavity device.

6. The combination of claim 1 wherein said coupler means includes a plurality of signal input leads through which light is propagated at velocities proportional to intensity.

7. The combination of claim 1 wherein said optical fiber includes a photorefractive body, a plurality of wave guide cores embedded in said body from which light escapes during said propagation of the optical waves and a cladding on the photorefractive body.

8. The combination of claim 1 wherein said coupler means includes optical wave guide means for optical path length adjustment of the resonator cavity device.

9. The combination of claim 1 including a dopant applied to the optical fiber enhancing stimulated emission gain during said predominant propagation of said one of the optical waves.

10. The combination of claim 9 wherein said dopant establishes ultra-narrow linewidth resonance within the resonator cavity at a resonant frequency corresponding to a null mode during which substantially all of the optical waves are absorbed.

11. In a data processing system having a plurality of optical resonators within which circulation of light energy is established under resonance conditions, a data source, means for coupling said data source to a first group of the optical resonators within which the resonance conditions are established corresponding to different oscillation modes therein; optical transmitting means for modally coupling each of the optical resonators of said first group to a second group of the other optical resonators to correlate the input signals from the data source; controller means connected to the optical resonators of the first group for modal interaction therebetween; and feedback means coupling said second group of the other optical resonators with the controller means for modification of the modal interaction between the optical resonators of the first group.

12. The system of claim 11 wherein said data source is an illuminated field of view from which the input signals form an image pattern.

13. The system of claim 12 wherein the optical resonators of the first group respectively receive the input signals corresponding to different features of the image pattern.

14. The system of claim 13 wherein said modification of the modal interaction by the feedback means is for signal error correction purposes in recognition of the image pattern.

15. The system of claim 12 wherein said said modification of the modal interaction by the feedback means is for signal error correction purposes in recognition of the image pattern.

16. The system of claim 11 wherein said modification of the modal interaction by the feedback means is for signal correction purposes.

17. The system of claim 11 wherein each of the optical resonators includes pump beam driving means for inducement of said circulation of the light energy and optimizing means for controlling said inducement to a varying degree from a chaos threshold in accordance with a dynamic annealing schedule.

18. In a resonator through which optical waves are transmitted, an optical fiber comprising a plurality of wave guide cores through which said optical waves are propagated, a photorefractive body within which the wave guide cores are embedded and focussing means responsive to quadratic index variation for inducing return of light escaping from the wave guide cores during propagation of the optical waves therethrough.

19. The resonator as defined in claim 18 including an outer cladding on the photorefractive body.

20. The resonator as defined in claim 19 wherein said wave guide cores are aligned in cross-sectional offset relation to the photorefractive body to accommodate said return of the escaping light to the wave guide cores.

21. The resonator as defined in claim 18 wherein said wave guide cores are aligned in cross-sectional offset relation to the photorefractive body to accommodate said return of the escaping light to the wave guide cores.

22. In a data processing system including at least two arrays of optical resonators, an image data source coupled to one of said two arrays, said one of the two arrays having correlator means for modal correlation of signals emitted therefrom, and means operatively interconnecting said two arrays for controlling said modal correlation, including: a signal transforming array and means operatively coupling said signal transforming array to each of the optical resonators of the other of said two arrays for generating feedback control signals fed to said one of the two arrays in response to reception of the signals emitted therefrom.

23. The system as defined in claim 22 wherein said means operatively coupling the signal transforming array comprises a plurality of spatial light modulators receiving the signals emitted from said one of the two arrays and means connecting said spatial light modulators to each of the optical resonators of said other of the two arrays for controlling light transmittance in accordance with modes of the optical resonators.

24. The system as defined in claim 23 wherein said signal transforming array comprises a plurality of optical transforms respectively positioned in operative relation to the spatial light modulators, said optical transforms respectively producing different tag components of the feedback control signals.

25. The system as defined in claim 22 wherein said signal transforming array comprises a plurality of optical transforms respectively producing different tag components of the feedback control signals.

* * * * *